V. SOUČEK.
MACHINE FOR MAKING BRIQUETS.
APPLICATION FILED OCT. 19, 1911.
1,054,464.
Patented Feb. 25, 1913.
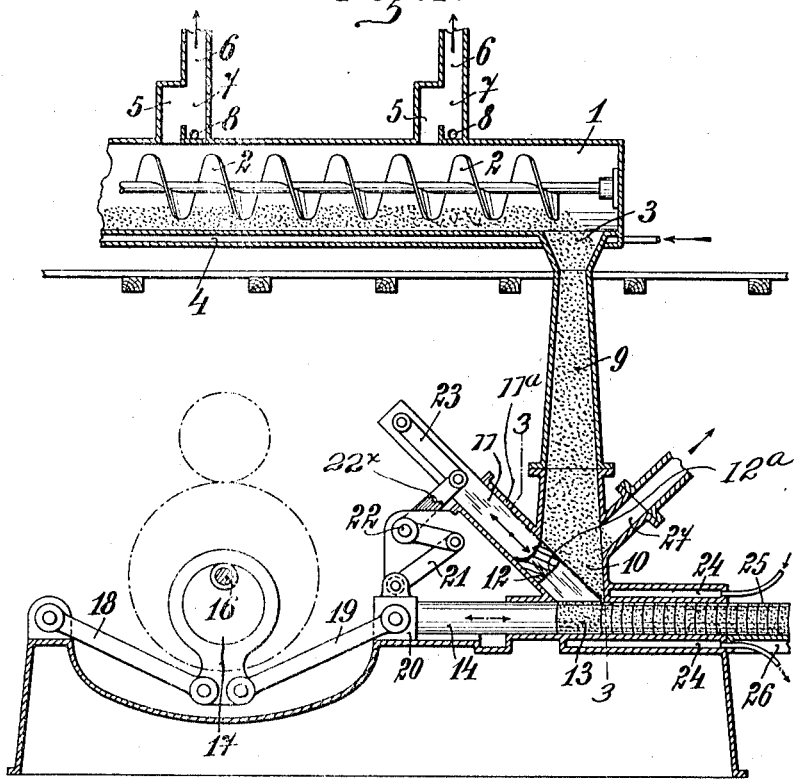
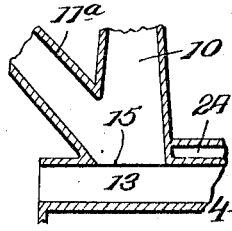
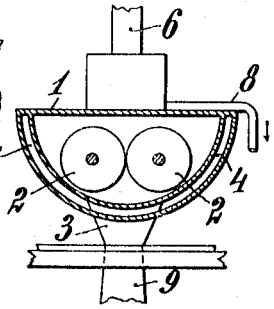
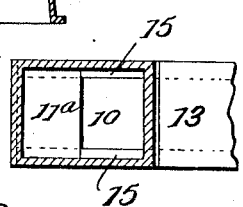
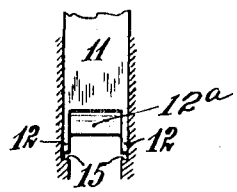
Witnesses
U. A. Williams
H. Cornwell
Inventor
V. Souček
by [signature]
Atty.

UNITED STATES PATENT OFFICE.

VÁCLAV SOUČEK, OF MOCHOV, AUSTRIA-HUNGARY.

MACHINE FOR MAKING BRIQUETS.

1,054,464.  Specification of Letters Patent.  Patented Feb. 25, 1913.

Application filed October 19, 1911. Serial No. 655,612.

*To all whom it may concern:*

Be it known that I, VÁCLAV SOUČEK, a subject of the Emperor of Austria-Hungary, and resident of Mochov, Kingdom of Bohemia, Austro-Hungarian Empire, have invented certain new and useful Improvements in Machines for Making Briquets, of which the following is the specification.

This invention relates to a machine for making horse food into briquets.

The object of the invention is to provide means for extracting the moisture from the product from which the briquets are formed, before and during the formation of the briquets.

A further object of the invention is to provide improved means for feeding the material to the compressing mechanism, and also improved means for compressing the briquets.

The invention also comprehends improvements in the details of construction and arrangement of parts which will be hereinafter described and particularly pointed out in the claims.

In the drawings: Figure 1 is a vertical central section of my improved machine. Fig. 2 is a detail transverse section through the feeding trough. Fig. 3 is a detail cross section taken through the feeding plunger on the line 3—3, Fig. 1. Fig. 4 is a detail vertical section of the chute. Fig. 5 is a detail horizontal section of the same.

1 indicates a trough semi-circular in cross section, and provided at its bottom with a heating chamber 4, into which the hot air or steam is introduced. Mounted in the trough are two spiral conveyers 2—2, suitably rotated to carry the material from which the briquets are formed to the delivery opening 3. Communicating with the top of the trough 1, are vent openings, over each of which is a casing 5. Each casing is provided with a lateral opening 6, out of alinement with the vent opening in the trough, and directly under the opening 6 is formed a channel 7 with which a pipe 8 communicates.

Communicating with the delivery opening 3, is a chute 9, the lower end of which registers with a hopper 10 of a compressing mechanism. Below the hopper 10 is a horizontally disposed chamber 13 surrounded by a heating chamber 24, into which heated air or steam may be introduced.

Extending at an angle from the hopper 10, is a guide in which reciprocates a plunger 11. At the bottom of the guide 11ª and on the opposite sides thereof are shoulders 15—15, the surfaces of which are horizontal and are approximately on the plane with the upper part of the chamber 13. The lower end of the plunger 11 is formed with two projecting flanges 12—12, which operate on the inner surfaces of the walls of the chute 9. The active end 12ª of the plunger 12 is above the lower edges of the flanges 12 and is disposed at right angles to the angular disposition of the guide so as to properly force the material down into the chamber 13. Operating in the chamber 13 is a plunger 14 which compresses the material fed to the chamber by the plunger 11.

Mounted on a horizontal shaft 22, located between the plungers 11 and 14 is a bell crank lever 22ˣ, one arm of which is pivoted to a link 23, pivoted near the top of the plunger 11. The other arm of the bell crank lever 22ˣ is pivoted to a link 21, the lower end of which is pivoted to the rear end of the plunger 14, as at 20. By this construction the plunger 14 is moved toward the rear, while the plunger 11 is moved downwardly into the hopper 10 to force a charge of material into the chamber 13.

The plungers 11 and 14 are operated by an eccentric 17, mounted on a shaft 16, the latter being rotated by any suitable means. A link 19 is pivoted at one end to an extension of the eccentric and its opposite end is pivoted to the plunger 14. Pivoted on the opposite side of the extension of the eccentric yoke, is pivoted one end of a lever 18, the opposite end of which is pivoted to the frame of the machine in alinement with the pivotal connection between lever 19 and the plunger 14. The levers 18 and 19 act as a toggle connection so that when the eccentric is rotated the plungers will be reciprocated.

In operation the material from which the briquets are to be formed is introduced to the trough 1 and is fed forward to the opening 3 by the conveyers 2. The material while in the trough is subjected to the heat from the chamber 4, and the moisture is extracted. The vapor from the material rises and passes through the vent openings and is deflected through the exit openings 6. To avoid the condensed vapor being returned to the material the channels 7 are provided. The condensation accumulates in the troughs 7 and passes off through the pipes 8, thereby insuring the material being perfectly dry. The material falls through the chute 9 and into the hopper 10 and in front of the plunger 11 and also in the chamber 13. Then upon the rotation of the shaft 16, the charge in the chamber 13 will be compressed into briquets. When the plunger 14 is withdrawn the plunger 11 is simultaneously driven down to introduce another charge to the chamber 13 so that the operation of feeding a definite charge to the chamber and the forming of a briquet takes place continuously.

The function of the projections 12 is two fold. When the plunger 11 is forced down the projections confine the material, so that the active or plunger surface $12^a$ will have direct contact with the material thereunder. The second function performed by the projections and the shoulders 15, is that in case any of the parts should break the movement of plunger 11 will be stopped by the shoulders and thereby prevented from accidentally falling into the path of the reciprocation of the plunger 14.

It may be noted at this time that when the plunger 11 is raised, the material falls below the end $12^a$ and also as the plunger 14 is being withdrawn, said material will also fall into the chamber 13. Now when the plunger 11 is lowered it preliminarily compresses the charge which tends to hold it in block form in said chamber. Hence the charge will better resist the force of the plunger 14 and will not crumble.

The briquets while formed in a continuous strip, may readily be separated as each briquet is formed by a single charge and is simply held to the adjacent briquet by adhesion. The heated condition of the briquets at the time they are formed serves to cause the particles of material to more readily adhere to each other and thereby a homogeneous mass is produced. By means of the dry condition of the material, when the plungers are reciprocated, dust will rise and in order that it may not become mixed with the product, I provide a vent opening 27 in the side of the hopper 10.

Briquets formed by a machine of the kind described retain all the nutritive qualities of the food, and as practically all the moisture is removed the material will not deteriorate.

What I claim is:

1. In a machine of the class described, the combination of a chute, a horizontal chamber communicating with the chute, a plunger operating in said chamber, an inclined plunger operating in the chute to force material in said chamber, links connecting the two plungers whereby when one of said plungers is withdrawn, the other will be forced forward in operative position, and means for operating the plungers.

2. In a machine of the class described, the combination of feeding means including a chute, an inclined hollow guideway, communicating with the chute, a chamber communicating with the inclined hollow guideway, a plunger operating in the chamber, a plunger operating in the chute above the chamber, means connecting the plungers to cause them to operate in opposite directions, whereby to feed a charge to the chamber and subsequently compress a said charge in the chamber, an eccentric, links operated by the eccentric, a support, the end of one of the links being pivoted to one of the plungers, the other of said links being pivoted to the support, and means for operating the eccentric.

3. In a machine of the class described, the combination of a trough, a chute communicating with the trough, an inclined plunger at the bottom of the chute, said inclined plunger having spaced projections at its lower end to form with the chute a pocket, a chamber communicating with the chute below the inclined plunger, a plunger operating in the chamber, and means for operating the inclined plunger to force a charge of material into the chamber and subsequently operating the second mentioned plunger to compress the charge in the chamber.

4. In a machine of the class described, the combination of a chute formed at its lower end with an inclined guideway, a plunger mounted to reciprocate in the guide-way, a chamber communicating with the chute, below the guide-way, a plunger operating in the chamber, a system of levers connecting the two plungers, whereby to oppositely reciprocate same, means for heating the chamber, and means for feeding the material to the chute.

5. In a machine of the class described, the combination of the chute, an inclined plunger operating in the bottom of the chute, a chamber communicating with the chute below the inclined plunger, a horizontal plunger operating in the chamber, a shaft, a bell crank lever on the shaft, links connecting the bell crank lever and the two plungers, whereby to simultaneously operate same, an eccentric, and toggle levers connected with one of the plungers and operated by the eccentric to impart motion to the plungers.

In testimony whereof I affix my signature in presence of two witnesses.

VÁCLAV SOUČEK.

Witnesses:
JAN B. VOJÁČEK,
ANTONIN VYSKOČIL.